US009472084B1

(12) United States Patent
Barak et al.

(10) Patent No.: US 9,472,084 B1
(45) Date of Patent: Oct. 18, 2016

(54) ALARM NOTIFICATION BASED ON DETECTING ANOMALIES IN BIG DATA

(71) Applicant: CA, Inc., Islandia, NY (US)

(72) Inventors: Nir Barak, Karmei Yosef (IL); Yaacov Bezalel, Holon (IL); Serge Mankovskii, San Ramon, CA (US)

(73) Assignee: CA, Inc., New York, NY (US)

( * ) Notice: Subject to any disclaimer, the term of this patent is extended or adjusted under 35 U.S.C. 154(b) by 54 days.

(21) Appl. No.: 14/207,180

(22) Filed: Mar. 12, 2014

(51) Int. Cl.
*G08B 21/00* (2006.01)
*G08B 21/18* (2006.01)
*G06F 11/00* (2006.01)
*G05B 13/02* (2006.01)
*G06F 17/00* (2006.01)

(52) U.S. Cl.
CPC .................................... *G08B 21/18* (2013.01)

(58) Field of Classification Search
CPC .. H04L 43/10; H04L 43/045; G06F 11/0766; G06F 21/55
USPC ............. 340/540; 714/26; 709/224; 726/23; 700/47; 706/47
See application file for complete search history.

(56) References Cited

U.S. PATENT DOCUMENTS 8,341,106 B1 * 12/2012 Scolnicov .............. G06N 7/005 702/50
2008/0162689 A1 * 7/2008 Krishnamurthy ... H04L 41/5009 709/224
2012/0304007 A1 * 11/2012 Hanks ..................... H04L 67/12 714/26
2014/0114442 A1 * 4/2014 Li ....................... G06F 11/0736 700/47
2014/0143868 A1 * 5/2014 Shiva .................... G06F 21/552 726/23
2014/0195667 A1 * 7/2014 Ketchum .............. H04L 43/067 709/224
2015/0163121 A1 * 6/2015 Mahaffey ............ G06F 11/0766 707/687

OTHER PUBLICATIONS

Hullman, J., et al., "Contextifier: Automatic Generation of Annotated Stock Visualizations." CHI 2013. Apr. 27, 2013. ACM, New York, NY. USA.
Chandola, Varun. "Anomaly Detection for Symbolic Sequences and Time Series Data." Thesis submitted to the faculty of the Graduate School of the University of Minnesota. Sep. 2009.

* cited by examiner

*Primary Examiner* — Jack K Wang
(74) *Attorney, Agent, or Firm* — Coats & Bennett, PLLC

(57) ABSTRACT

Monitoring circuitry monitors a computing device for configuration changes and performance changes. The monitoring circuitry also logs that data (CDD and PDD data) to a database. An analysis circuit analyzes the CDD and PDD data to determine whether an anomaly exists. If the analysis circuit determines that an anomaly exists, it generates an alarm to alert appropriate personnel to the anomaly.

21 Claims, 5 Drawing Sheets

ALARM NOTIFICATION BASED ON DETECTING ANOMALIES IN BIG DATA

BACKGROUND

The present disclosure relates to anomaly detection in systems that analyze big data to detect anomalies, and more particularly to generating alarms that notify maintenance personnel to the anomalies.

Software configuration changes, such as the installation, patch, upgrade, and removal of a software component, can have a significant impact on the performance of a computing device. Additionally, such changes may affect demands for memory resources, network resources, and storage resources. Often times, IT management software is deployed and is configured to detect such configuration changes, and identify the changes as anomalies in the behavior of the computing device. System administrators, for example, need this type of information to assist them analyze the performance of the computing device.

Conventionally, system administrators and other maintenance personnel must manually examine log files related to the detected changes to determine whether a configuration change occurred. However, once a configuration change is detected, the system administer must typically investigate the so-called anomaly further to determine if the configuration change is responsible for an observed change in performance of the computing device. This process, however, is tedious and error prone.

Particularly, with conventional systems, a system administrator is only able to observe a change in configuration of the computing device and then correlate that change to a suspected anomaly. Conventional systems do not consider that computer devices may behave one way under one set of circumstances, but another way under another set of circumstances (e.g., a software install, upgrade, removal, patch, hardware change, and the like). Further, conventional systems do not account for the fact that the behavior of a computing device may change after a configuration change, but that such behavior may be considered normal for the configuration change. Actions such as alarm generation and corrective action are generally warranted only when the behavior of a given computing device is truly abnormal.

BRIEF SUMMARY

The present disclosure provides a method, a processing circuit, and a computer program product for analyzing big data to determine whether an anomaly in a behavior of a computing device exists, and for generating alarms to alert appropriate personnel to the anomalies.

More particularly, monitoring components will monitor and log configuration and performance data related to a computing device to a big data warehouse. Simulation circuitry then correlates the logged data to events detected at the computing device, and generates a predictive model representing how the computing device performs normally under a given set of circumstances. Analysis circuitry then detects suspected anomalies and compares them to the predictive models to determine whether a given behavior for the computing device is normal.

The use of the predictive models reduces the number of alarms that are generated for the computing device by allowing the computing device to more accurately classify a suspected anomaly as a true anomaly, and exposes information related to installations to big data systems to allow for tracking. Further, detection of such anomalies will permit the automatic adjustment of the parameters at the computing device so as to correct for expected or detected errors at the device.

Accordingly, in one embodiment, the present disclosure provides a method for generating an alarm notification for a detected anomaly. In this embodiment, the method comprises receiving data representing a behavior of a computing device executing a software program. The data comprises a configuration component that indicates a configuration of the computing device, as well as a performance component that indicates a performance of the computing device. The method then generates a correlated data set that indicates a current behavior for the computing device. The correlated data set comprises the configuration component of the data correlated with the performance component of the data for a specified time window. Once correlated, the method determines whether an anomaly in the current behavior of the computing device exists based on the correlated data set, and if so, selectively generates an alarm for the detected anomaly based on comparing the current behavior of the computing device to a baseline behavior for the computing device.

In another embodiment, the present disclosure provides an anomaly processing circuit comprising a correlator circuit, an anomaly detection circuit, and an anomaly classifier circuit. The correlator circuit receives data that represents a behavior of a computing device executing a software program, and generates a correlated data set indicating a current behavior for the computing device. The received data comprises a configuration component indicating a configuration of the computing device and a performance component indicating a performance of the computing device, and the correlated data set comprises the correlation of the components for a specified time window. The anomaly detection circuit determines whether an anomaly in the current behavior of the computing device exists based on the correlated data set, while the anomaly classifier circuit selectively generates an alarm for the detected anomaly based on a comparison of the current behavior of the computing device to a baseline behavior for the computing device.

In another embodiment, the present disclosure also provides a computer program product comprising a computer-readable medium configured to store a computer program. When executed by a computing device, the computer program configures an Anomaly Processing Circuit (APC) associated with the computing device to receive data representing a behavior of a computing device executing a software program, and generate a correlated data set indicating a current behavior for the computing device. The received data comprises a configuration component indicating a configuration of the computing device and a performance component indicating a performance of the computing device, and the correlated data set comprises the configuration component of the data correlated with the performance component of the data for a specified time window. Additionally, the computer program also configures the APC to determine whether an anomaly in the current behavior of the computing device exists based on the correlated data set, and to selectively generate an alarm for the detected anomaly based on comparing the current behavior of the computing device to a baseline behavior for the computing device.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
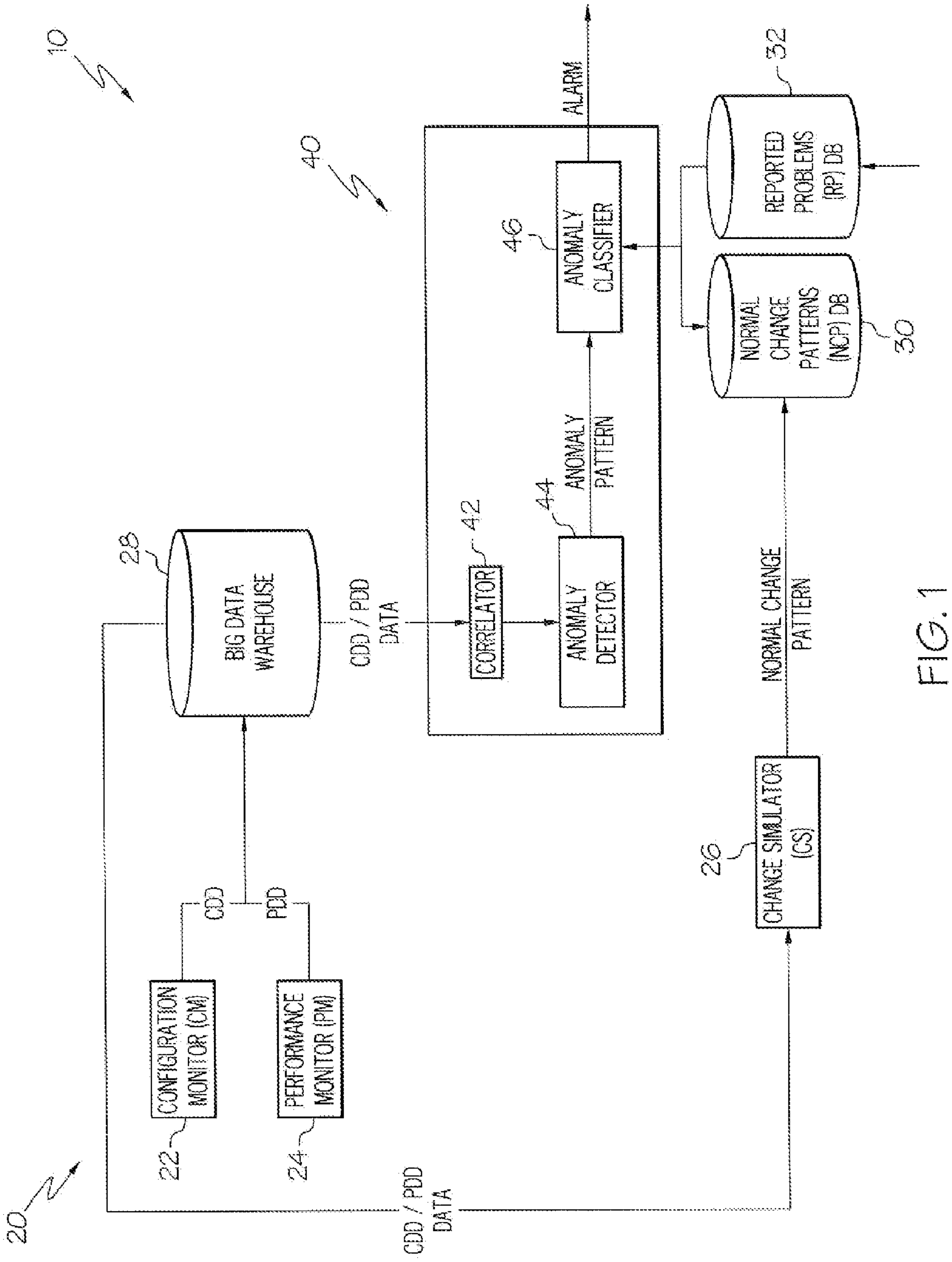
FIG. 1 is a block diagram illustrating the functional components of a system configured according to one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Pen, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a computer-implemented method, a processing circuit, and a computer program product for analyzing big data to determine whether an anomaly in a behavior of a computing device exists, and if such an anomaly exists, for generating an alarm to alert the appropriate administrative or maintenance personnel to the anomaly. Such a system operating according to the present disclosure helps to ensure that the administrative or maintenance personnel are notified only when an actual alarm condition may exist.

Turning now to the drawings, FIG. 1 is a block diagram illustrating some of the functional components of a system 10 configured according to one embodiment. As seen in FIG. 1, system 10 comprises a Monitoring Circuit (MC) 20 and an Anomaly Processing Circuit (APC) 40. The MC 20 monitors a given computing device, and based on that monitoring, detects and stores a set of "normal" patterns in a database 30. The "normal" patterns define normal behaviors for a given configuration of the computing device under a given set of circumstances. Generally, the MC 20 begins its analysis prior to any configuration changes in the computing device, but also continues is functions after the computing device experiences configuration changes.

In more detail, the MC 20 comprises a Configuration Monitor (CM) circuit 22, a Performance Monitor (PM) circuit 24, and a Change Simulator (CS) circuit 26, each of which may comprise hardware, or a combination of hardware and software. The CM 22 is configured to monitor a given computing device for configuration changes, and to collect and store the resultant data. By way of example only, such changes may comprise the addition/removal/reconfiguration of new hardware, the installation/update/removal of software, data, and the like. The CM 22 may, for example, monitor user input entered at a command prompt that launches a software installation. In another embodiment, the CM 22 intercepts messages communicated to/from the Operating System (OS) to detect configuration changes at the computing device. In yet another embodiment, the CM 22 comprises a "wrapper" that is part of the installation package of a software component. Additionally, the CM 22 may also monitor the execution of the given task to determine when the task is complete. Whatever its form, however, CM 22 outputs data representing the detected changes in configuration (i.e., CDD) to a Big Data Warehouse 28 for storage.

The PM 24 also monitors the computing device; however, rather than monitor configuration changes at the computing device, the PM 24 monitors the hardware and/or software executing on the device, to detect changes in the performance of the computing device. The PM 24, which may comprise sensor devices and or software modules executing locally, for example, then outputs data representing the detected performance (i.e., PDD) to the Big Data Warehouse 28 for storage. Some examples of performance data that the PM 24 may be designed to collect include, but are not limited to, the temperature of a device component (e.g., a processor), execution speed of the processor, throughput, resource usage, and the like.

The CS 26 is a simulator circuit configured to identify the normal behaviors of the computing device. More particularly, the CS 26 performs a series of simulations on the CDD/PDD data to determine the possible effects of all the changes in the configuration of the computing device (e.g., installation or removal of software) having a corresponding problem entry in RP DB 32. The CS 26 then produces a statistical model of possible future normal behavior s for the computing device and stores them in the NCP DB 30 as "baseline" or "normal" behaviors.

In more detail, CS 26 obtains the CDD/PDD data from the Big Data Warehouse 28 from time to time, and correlates the CDD to the PDD data. For example, the CS 26 may cross correlate time data appearing in both the CDD and PDD data streams, and then annotate the PDD data stream using, for example, information and data retrieved from the RP DB 32.

Once the PDD data stream is annotated, the CS then processes the correlated data to detect patterns of "normal" or expected behavior using well-known techniques. Such techniques include, but are not limited to, multivariate regression. Multivariate regression analysis is a technique that is well-known to those of ordinary skill in the art, and therefore, not described in detail here.

By way of example, CS 26 might determine from processing the correlated CDD/PDD data that a central processing unit (CPU) at the computing device slowed significantly during a large software install. However, as this type of behavior may be expected during such an install, the CS 26 could generate a pattern indicating that such a decrease in processing time would be normal under these particular change conditions. So generated, the CS 26 could then store that pattern in a database of normal patterns referred to herein as a Normal Change Pattern (NCP) DB 30. Those patterns may be supplemented with information stored at a Reported Problems (RP) database 32. As described in more detail below, the NCP DB 30 is consulted by a component in the APC 40 to determine whether a given performance measurement indicates a possible anomaly, and thus, may be cause for an alarm.

The APC 40 also receives the CDD/PDD data from time to time. In one embodiment, the APC 40 receives the CDD/PDD data responsive to detecting an event associated with a software program executing on the computing device (e.g., a software install). The APC 40 is configured to process the CDD/PDD data to detect whether an anomaly exists based on the performance data (PDD), and to determine whether the anomaly is a problem that requires an alarm, or whether the anomaly can be considered as normal behavior under the particular circumstances of the detected change in configuration (i.e., CDD). To accomplish this goal, the APC 40 comprises a Correlator circuit (CC) 42, an Anomaly Detector (AD) circuit 44, and an Anomaly Classifier (AC) circuit 46.

The CC 42 obtains and correlates the CDD/PDD data from the Big Data Warehouse 28. The CC 42 is shown here as part of the APC 40, but in other embodiments, may be part of the Big Data Warehouse 28 or another different computing device. In operation, the CC 42 generates a correlated data set that correlates the CDD data to the PDD data for a specified time window. The window covers the behavior of the computing device for a predetermined period of time before and after a given point in time (e.g., a detected event associated with the software executing on the computing device). The CC 42 then outputs the correlated data set to the AD circuit 44 for further processing.

The AD circuit 44 processes the correlated data set to determine if an anomaly may exist. An anomaly is defined herein as a performance behavior that is outside the realm of an accepted threshold of behavior. By way of example, a processor at the computing device may be running slow, or the temperature of a given processor or other hardware component may be too high. As another example, a given piece of software executing on the computing device may be running slow. There may be different types and values of thresholds that define the acceptable limits for different types of behaviors of the computing device—however, all such thresholds are predetermined and provisioned to the computing device by a user or other operator. If the AD circuit 44 does not detect an anomaly, the AD circuit 44 simply drops the data and repeats the processing for the next correlated data set. However, if the AD circuit 44 determines that an anomaly does exist, the AD circuit 44 passes the correlated CDD/PDD data to the AC circuit 46.

The AC circuit 46 processes the incoming correlated data set to determine whether an anomaly actually exists, or whether the suspected anomaly is actually normal behavior for the computing device given the current configuration changes. For example, a processor would be expected to run slow during a large software install or upgrade, and thus, may not constitute an actual anomaly. In conventional systems, such a degraded performance may have been considered worthy of generating an alarm. However, under these circumstances, little could be done to "correct" the situation. Once the software install or upgrade was finished, performance would return to normal. Notwithstanding this, however, conventional systems would have needlessly still generated the alarm. The AC circuit 46 avoids such unnecessary alarm generation, however, by processing the suspected anomaly further to determine whether the behavior really was cause for an alarm.

Particularly, the AC circuit 46 has access to the NCP DB 30, which comprises a database of historical patterns correlating detected behaviors for the computing device to configuration changes at the computing device. These normal patterns are considered to be indicative of "normal" or expected behavior for a given set of circumstances (e.g., a given configuration change), and thus, would prevent the AC circuit 46 from generating an alarm needlessly. To accomplish its function, the AC circuit 46, in one embodiment, compares the correlated CDD/PDD data received from the AD circuit 44 to the normal patterns stored in the NCP DB 30. If a "normal" pattern is found in the DB 30, the AC circuit 46 determines that no alarm really exists, and the behavior detected by the PM 24, while it may be out of the ordinary, is not cause for an alarm under these particular circumstances (e.g., a decrease in processing speed during a large software install/upgrade). If no pattern exists, however, the AC circuit 46 may generate an alarm to alert the administrator or other operator to the anomalous behavior. As stated previously, to assist in its processing, the AC circuit 46 may also have access to the RP DB 32 that stores a set of problems that have been reported by the administrator, the operators, or other users.

Figure 2:
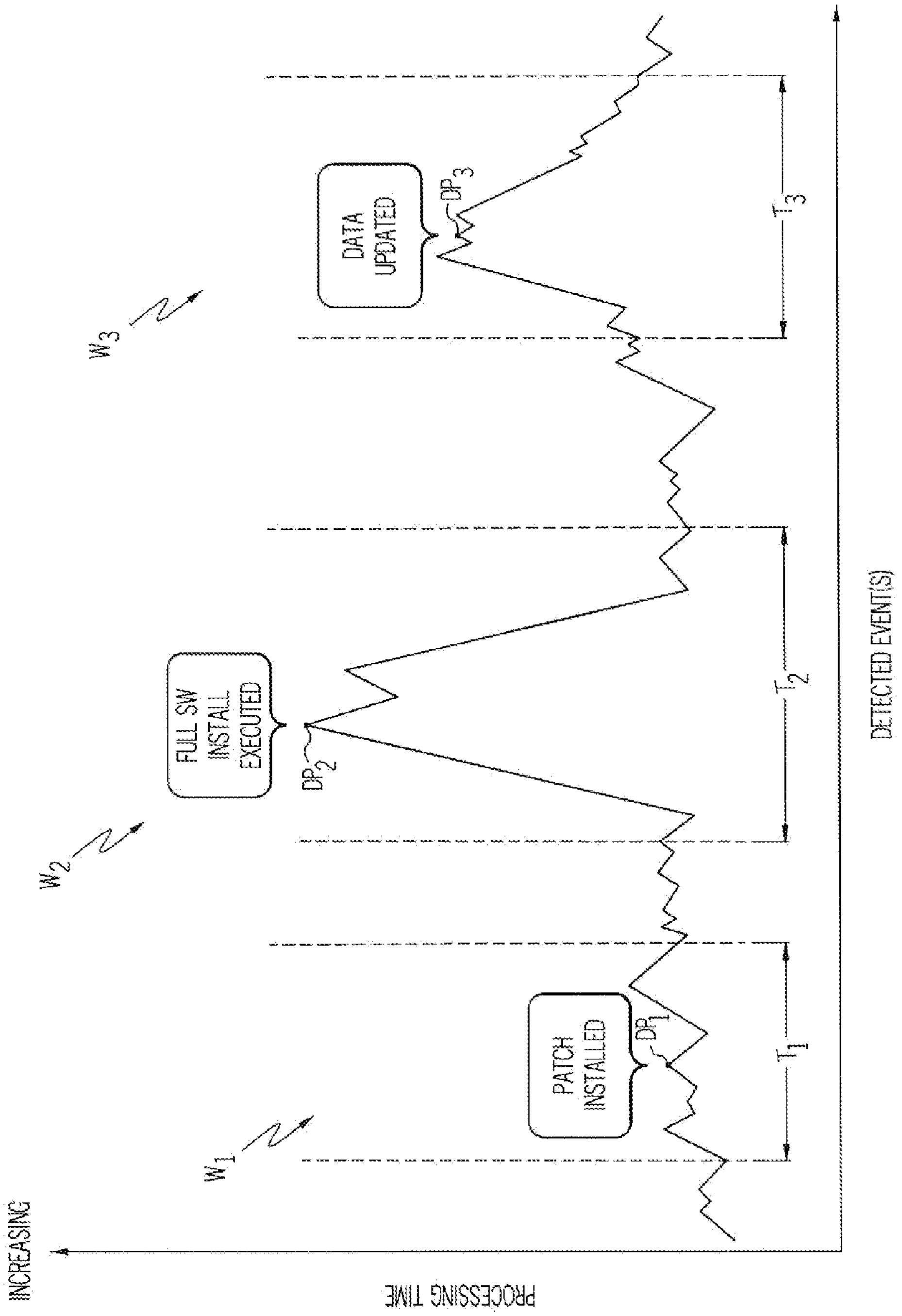
FIG. 2 is a chart illustrating the processing of some of the functional components of a system configured according to one embodiment.

FIG. 2 is a chart illustrating the processing of the AD circuit 44 and the AC circuit 46. The chart plots the amount of time that the computing device needed to process a task against events that occur at, and are detected by, the computing device. However, as stated previously, processing time is not the only metric on which the embodiments of the present disclosure can operate. Other metrics may also be used in addition to, or in lieu of, the processing time.

FIG. 2 illustrates three data points $DP_1$, $DP_2$, and $DP_3$ (collectively, "DP"), each of which represent an occurrence of some detected event, such as the installation of a patch ($DP_1$), the execution of a full install of a software package ($DP_2$), and a data update ($DP_3$). Other events, as previously stated, are also possible. Additionally, each data point is contained within a respective predetermined time window $W_1$, $W_2$, and $W_3$ (collectively, "W"). Each time window defines a predetermined time before and after the occurrence of its respective event.

In operation, the AD circuit 44 extracts data from the correlated CDD/PDD data and generates the time windows W to cover a predetermined time before and after its corresponding DP. The AD circuit 44 then generates a current behavior pattern from the data that represents the performance of the computing device within that time window W. These current behavior patterns will be used to help detect whether the computing device is behaving normally or abnormally under the given set of circumstances.

The current behavior patterns are then passed to the AC circuit 46 for processing. The AC circuit 46 annotates the current behavior patterns with information from the RP DB 32, and the compares each current behavior pattern to the normal patterns stored in the NCP DB 30. If a normal pattern is found that matches a given current behavior pattern within some specified threshold percentage, for example, the AC circuit 46 would classify that current behavior pattern to be a "normal change pattern," and thus, no alarm would be generated. On the other hand, if a normal pattern is not located in the NCP DB 30, then the AC circuit 46 classifies that current behavior pattern as an "abnormal behavior pattern," and generates an alarm to send to the appropriate personnel.

Figure 3:
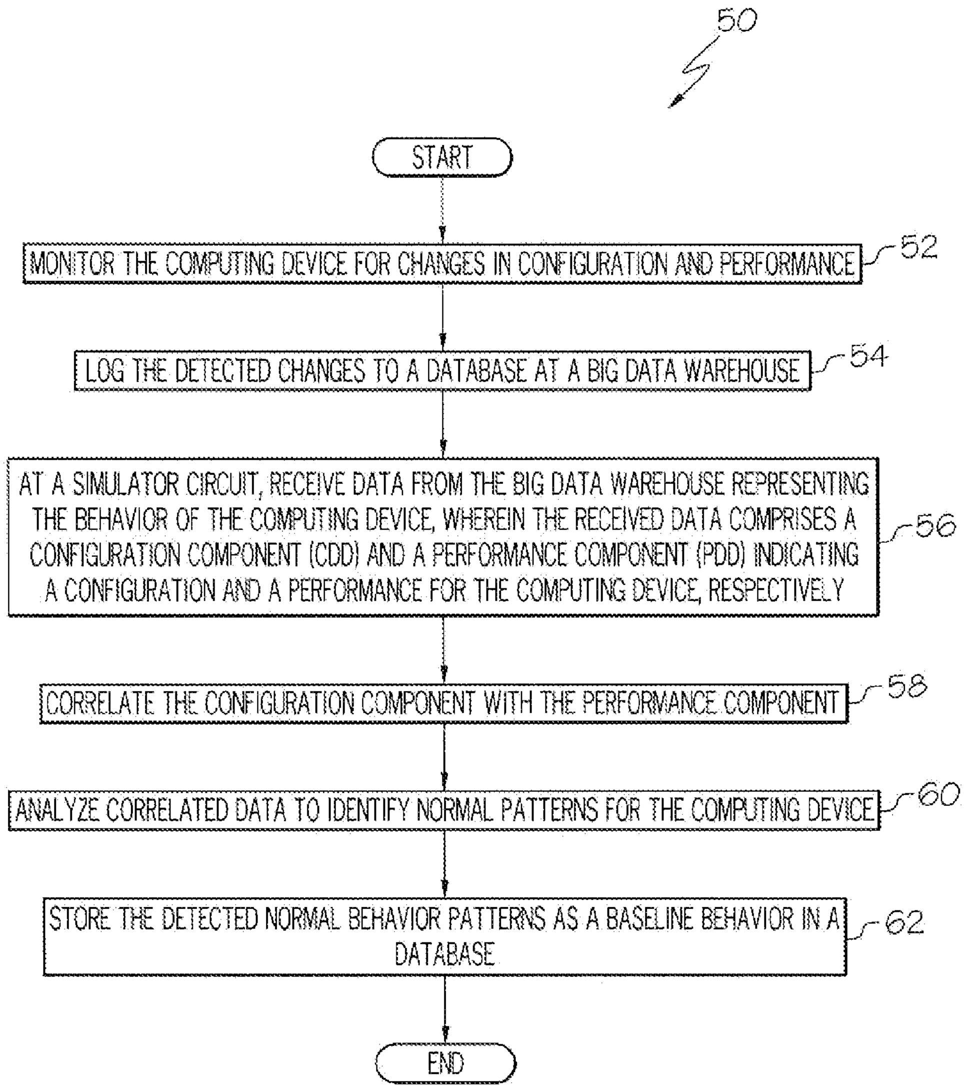
FIG. 3 is a flow diagram illustrating a method for detecting and storing normal behavior patterns for a computing device according to one embodiment.

FIG. 3 is a flow diagram illustrating a method 50 for collecting and analyzing the CDD/PDD data, and for predicting the "normal" patterns based on that data that are stored in the NCP DB 30.

As seen in FIG. 3, method 50 begins with the CM 22 circuit and the PM 24 circuit monitoring the computing device and collecting data representing the configuration and performance changes that occur at the computing device (box 52). The collected data (i.e., the CDD data from CM circuit 22 and the PDD data from PM circuit 24) is then logged to memory (box 54). Over time, the amount of data to be collected and analyzed may become very large. Therefore, in this embodiment, the CM circuit 22 and the PM circuit 24 log the CDD and PDD data respectively, to a Big Data Warehouse 28.

The CS circuit 26, as stated above, receives the CDD and PDD data from the Big Data Warehouse 28 (box 56), and correlates that data (box 58). The CS circuit 26 then performs a series of simulations on the CDD/PDD data to determine the possible effects that all the changes in the configuration of the computing device may have on the performance and behavior of the computing device (box 60). Based on this analysis, the CS 26 circuit then produces a statistical model of possible future normal behavior a for the computing device, and stores them in the NCP DB 30 as "baseline" or "normal" patterns for the computing device (box 62).

Figure 4:
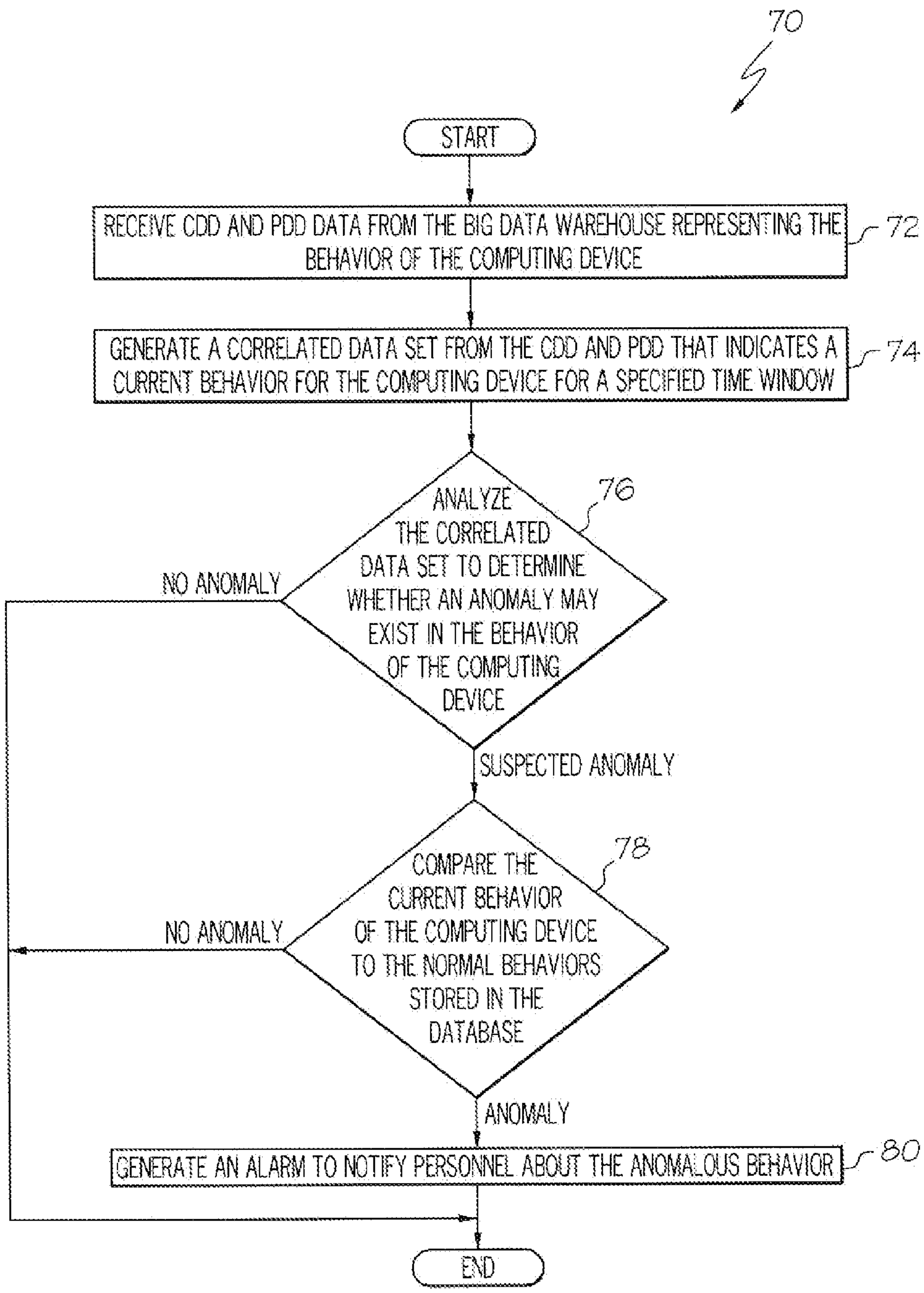
FIG. 4 is a flow diagram illustrating a method for selectively generating an alarm based on whether the system detects an anomaly in the behavior of the computing device according to one embodiment.

FIG. 4 is a flow diagram illustrating a method 70 in which the APC 40 processes the CDD/PDD data collected and stored by the CM circuit 22 and PM circuit 24 to identify abnormal behavior patterns for the computing device and generate an alarm to alert the appropriate personnel to that particular condition.

Method 70 begins with the CC 42 receiving the COD data and POD data representing configuration components and the performance components, respectively, of the computing device from the Big Data Warehouse 28 (box 72). As stated previously, the data may be received, for example, responsive to the ARC 40 detecting, or being informed of a predetermined event occurring at the computing device, such as the installation of new software, or the change-out of a hardware component and the like. Upon receipt, the CC 42 generates a correlated data set from the CDD/PDD data. The generated correlated data set correlates the detected configuration changes to the detected performance changes, and thus, indicates the current behavior of the computing device. As previously stated, the correlation covers a specified time window that extends a predetermined amount of time both before and after the occurrence of the detected event (box 74).

The AD circuit 44 then analyzes the correlated data to determine whether an anomaly may exist in the behavior of the computing device (box 76). If not, the AD circuit 44 simply drops the data and awaits the next correlated data set generated by the CC 42. if a possible anomaly is detected, however, the AD circuit 44 passes the data to the AC circuit 46 for further processing and classification. The AC circuit 46 then compares the patterns received from the AD circuit 44 to the normal patterns stored in the NCP DB 30 (box 78). If a match is found, or if a "normal" pattern is located in the NCP DB 30 that matches the current behavior pattern within a predefined percentage, the AC circuit 46 classifies the "anomaly" as normal. In other words, the AC circuit 46 would deem the behavior of the computing device, under the conditions dictated by the detected event, to be normal, and thus, no alarm would be generated. If the AC circuit 46 cannot find a match, however, the AC circuit 46 would deem the suspected anomaly to be an actual anomaly in the behavior of the computing device. In these latter cases, the APC 40 would then generate an alarm to notify the appropriate personnel about the anomalous behavior (box 80).

Figure 5:
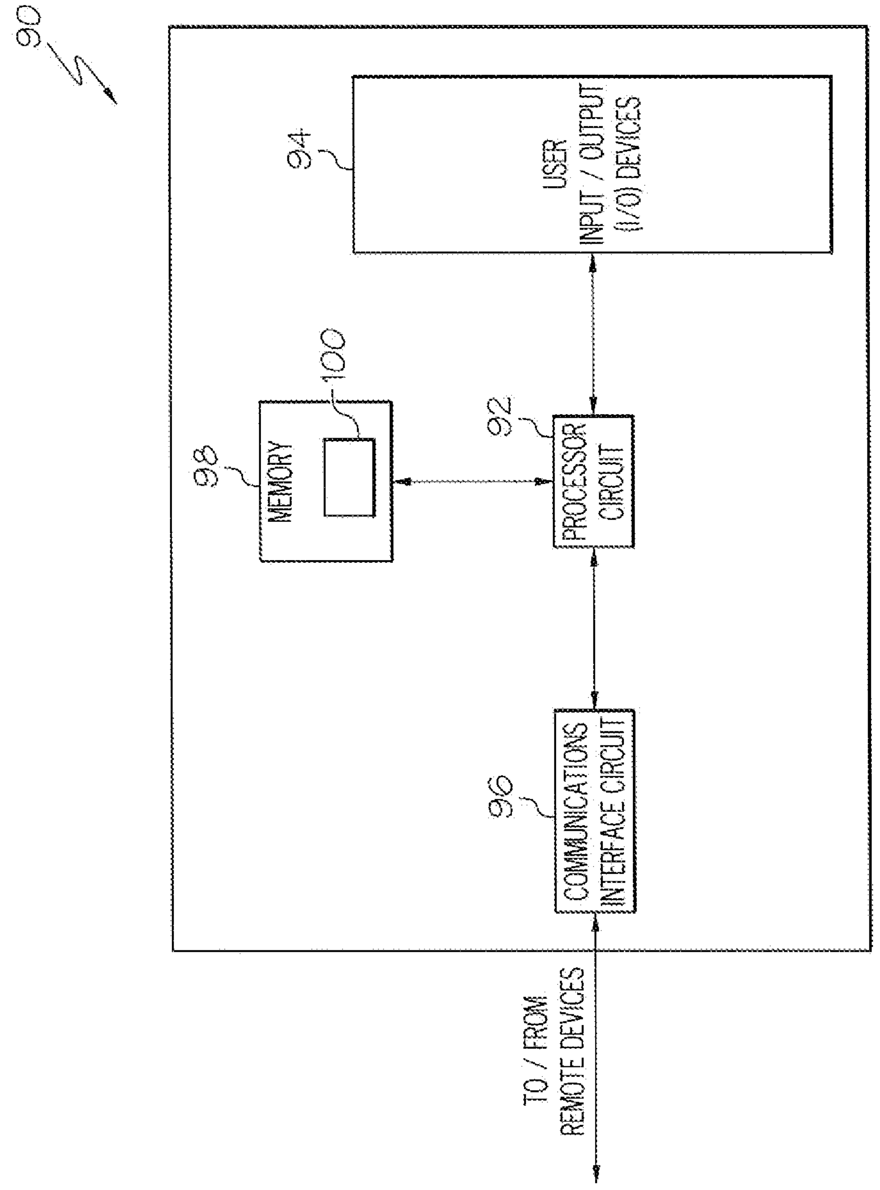
FIG. 5 is a block diagram illustrating some of the component parts that comprise a server device to selectively generate an alarm based on whether an anomaly in the behavior of the computing device exists according to one embodiment.

FIG. 5 is a block diagram illustrating some of the components of a computing device 90 configured according to one or more aspects of the present disclosure. The computing device 90 may be the same device that is monitored by the CM circuit 22 and the PM circuit 24, or it may be a different computing device.

As seen in FIG. 5, computing device 90 comprises a processor circuit 92, a user Input/Output (I/O) interface 94, a communications interface 96, and a memory circuit 98. Although not specifically seen in the figure, those of ordinary skill in the art will readily appreciate that computing device 90 may comprise other components not specifically shown herein.

Such components include, but are not limited to, a display monitor, a keyboard, a mouse, or other user input/output device.

The processor circuit 92 may be implemented, for example, as one or more programmable microprocessors, hardware, firmware, or a combination thereof. The processor circuit 92 generally controls the operation and functions of the computing device 90 according to logic and instructions and data stored in memory circuit 98. Such operations and functions include, but are not limited to correlating the CDD and PDD data received from the Big Data Warehouse 28, analyzing the correlated data to determine whether an anomaly might exists in the behavior of the computing device 90, classifying the suspected anomaly as being one that is worthy of an alarm, and if so, generating the alarm to alert the appropriate personnel to the alarm, as previously described.

In this embodiment, the processor circuit 92 comprises each of the CC 42, the AD circuit 44, and the AC circuit 46. However, those of ordinary skill in the art should appreciate that this is for illustrative purposes only. One or more of these circuits 42, 44, and 46, may be located on a different machine, and therefore, the functions described herein may be distributed. Similarly, the processor circuit 92 may also comprise, in one or more embodiments, one or more of the CM circuit 22, the PM circuit 24, and the CS circuit 26. However, placement of these circuits on the computing device 90 is illustrative only and the functions of any of these circuits may be performed by another different device communicatively connected to the computing device 90.

The user I/O interface 94 comprises the hardware and software required to allow a user to interact with the computing device 90. Although not specifically shown, such user I/O interfaces typically include, but are not limited to display devices, keypads and/or keyboards, pointer devices, microphones, speakers, and a variety of different ports with which the user may communicatively connect different devices to the computing device 90.

The communications interface 96 may comprise, for example, an ETHERNET interface or a wireless interface, such as a WiFi interface operating according to any of the 802.XX protocols. Communications interface 96 allows computing device 90 to communicate data and messages with remote terminals, such as email, for example, as well as with other devices connected to the computing device 90 via a network, using any of a variety of well-known and well-documented protocols, such as TCP/IP, for example. Other communication interfaces not specifically mentioned herein are also possible.

The memory circuit 98 may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory circuit 98 stores programs and instructions, such as a control application 100, which when executed by the processor circuit 92, controls the processor circuit 92 to perform the functions previously described.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method comprising:

receiving data representing a behavior of a computing device executing a software program, the data comprising a configuration component indicating a configuration of the computing device and a performance component indicating a performance of the computing device;

generating a correlated data set indicating a current behavior for the computing device, the correlated data set comprising the configuration component of the data correlated with the performance component of the data for a specified time window;

annotating the performance component of the data with information identifying a known problem associated with the behavior of the computing device;

determining whether an anomaly in the current behavior of the computing device exists based on the correlated data set;

classifying the anomaly in the current behavior of the computing device as being either normal or abnormal based on comparing the current behavior of the computing device to a baseline behavior for the computing device, and on the information used to annotate the performance component of the data;

if the anomaly is classified as being abnormal for the computing device, generating an alarm for the detected anomaly;

if the anomaly is classified as being normal for the computing device, storing the correlated data set and the information identifying the known problem associated with the behavior of the computing device as a baseline behavior for the computing device.

2. The method of claim 1 further comprising:

monitoring the computing device for changes in the configuration of the computing device;

monitoring the computing device for changes in the performance of the computing device; and logging the monitored changes in a database at a big data warehouse.

3. The method of claim 2 further comprising:

receiving the data representing the behavior of the computing device at a simulator circuit communicatively connected to the big data warehouse;

correlating, at the simulator circuit, the configuration component of the data with the performance component of the data;

detecting a pattern of normal behavior for the computing device based on an analysis of the correlated behavior; and storing the detected pattern in a database as the baseline behavior for the computing device.

4. The method of claim 1 wherein the specified time window comprises a predetermined time before and after detecting an event associated with the software program.

5. The method of claim 1 wherein determining whether an anomaly in the current behavior of the computing device exists based on the correlated data set comprises determining whether the anomaly exists responsive to detecting an event associated with the software program executing on the computing device.

6. The method of claim 5 wherein determining whether an anomaly in the current behavior of the computing device exists based on the correlated data set further comprises:

comparing a performance attribute defined in the correlated data set to a predetermined performance threshold.

7. The method of claim 1 wherein classifying the anomaly in the current behavior of the computing device as being either normal or abnormal based on comparing the current behavior of the computing device to a baseline behavior for the computing device, and on the information used to annotate the performance component of the data comprises:

comparing the correlated data set to a pattern stored in a memory circuit, wherein the pattern represents correlated detected behaviors of the computing device with respect to events detected at the computing device;

generating the alarm if comparing the correlated data set to the pattern indicates that the detected anomaly is abnormal behavior for the computing device with respect to the detected event; and ignoring the detected anomaly if comparing the correlated data set to the pattern indicates that the detected anomaly is normal behavior for the computing device with respect to the detected event.

8. An anomaly processing circuit comprising:

a correlator circuit configured to:

receive data representing a behavior of a computing device executing a software program, the data comprising a configuration component indicating a configuration of the computing device and a performance component indicating a performance of the computing device;

generate a correlated data set indicating a current behavior for the computing device, the correlated data set comprising the configuration component of the data correlated with the performance component of the data for a specified time window; and annotate the performance component of the data with information identifying a known problem associated with the behavior of the computing device;

an anomaly detection circuit configured to determine whether an anomaly in the current behavior of the computing device exists based on the correlated data set; and an anomaly classifier circuit configured to:

classify the anomaly in the current behavior of the computing device as being either normal or abnormal based on comparing the current behavior of the computing device to a baseline behavior for the computing device, and on the information used to annotate the performance component of the data;

if the anomaly is classified as being abnormal for the computing device, generate an alarm for the detected anomaly; and if the anomaly is classified as being normal for the computing device, storing the correlated data set and the information identifying the known problem associated with the behavior of the computing device as a baseline behavior for the computing device.

9. The anomaly processing circuit of claim 8 further comprising:

a configuration monitor circuit configured to monitor the computing device for changes in the configuration of the computing device;

a performance monitor circuit configured to monitor the computing device for changes in the performance of the computing device; and an output interface configured to log the monitored changes in a database at a big data warehouse.

10. The anomaly processing circuit of claim 9 further comprising a simulator circuit configured to:

receive the data representing the behavior of the computing device from the big data warehouse;

correlate the configuration component of the data with the performance component of the data;

detect a pattern of normal behavior for the computing device based on an analysis of the correlated behavior; and store the detected pattern in a database as the baseline behavior for the computing device.

11. The anomaly processing circuit of claim 8 wherein the specified time window comprises a predetermined time before and after detecting an event associated with the software program.

12. The anomaly processing circuit of claim 8 wherein the anomaly detection circuit is further configured to determine whether the anomaly exists responsive to detecting an event associated with the software program executing on the computing device.

13. The anomaly processing circuit of claim 12 wherein the anomaly detection circuit is further configured to:

compare a performance attribute defined in the correlated data set to a predetermined performance threshold.

14. The anomaly processing circuit of claim 8 wherein to classify the anomaly, the anomaly classifier circuit is configured to:

compare the correlated data set to a pattern stored in a memory circuit, wherein the pattern represents correlated detected behaviors of the computing device with respect to events detected at the computing device;

generate the alarm if comparing the correlated data set to the pattern indicates that the detected anomaly is abnormal behavior for the computing device with respect to the detected event; and ignore the detected anomaly if comparing the correlated data set to the pattern indicates that the detected anomaly is normal behavior for the computing device with respect to the detected event.

15. A computer program product comprising:

a physical computer-readable storage medium configured to store a computer program that, when executed by a computing device, configures an Anomaly Processing Circuit (APC) associated with the computing device to:

receive data representing a behavior of a computing device executing a software program, the data comprising a configuration component indicating a configuration of the computing device and a performance component indicating a performance of the computing device;

generate a correlated data set indicating a current behavior for the computing device, the correlated data set comprising the configuration component of the data correlated with the performance component of the data for a specified time window; and annotate the performance component of the data with information identifying a known problem associated with the behavior of the computing device;

determine whether an anomaly in the current behavior of the computing device exists based on the correlated data set;

classify the anomaly in the current behavior of the computing device as being either normal or abnormal based on comparing the current behavior of the computing device to a baseline behavior for the computing device, and on the information used to annotate the performance component of the data;

if the anomaly is classified as being abnormal for the computing device, generate an alarm for the detected anomaly; and if the anomaly is classified as being normal for the computing device, storing the correlated data set and the information identifying the known problem associated with the behavior of the computing device as a baseline behavior for the computing device.

16. The computer program product of claim 15 wherein the computer program further configures:

a configuration monitor circuit to monitor the computing device for changes in the configuration of the computing device;

a performance monitor circuit to monitor the computing device for changes in the performance of the computing device; and a communication interface to log the monitored changes in a database at a big data warehouse.

17. The computer program product of claim 16 wherein the computer program further configures a simulator circuit to:

receive the data representing the behavior of the computing device from the big data warehouse;

correlate the configuration component of the data with the performance component of the data;

detect a pattern of normal behavior for the computing device based on an analysis of the correlated behavior; and store the detected pattern in a database as the baseline behavior for the computing device.

18. The computer program product of claim 15 wherein the specified time window comprises a predetermined time before and after detecting an event associated with the software program.

19. The computer program product of claim 15 wherein the computer program further configures the APC to determine whether the anomaly exists responsive to detecting an event associated with the software program executing on the computing device.

20. The computer program product of claim 19 wherein the computer program further configures the APC to:

compare a performance attribute defined in the correlated data set to a predetermined performance threshold.

21. The computer program product of claim 15 wherein to classify the anomaly, the computer program further configures the APC to:

compare the correlated data set to a pattern stored in a memory circuit, wherein the pattern represents correlated detected behaviors of the computing device with respect to events detected at the computing device;

generate the alarm if comparing the correlated data set to the pattern indicates that the detected anomaly is abnormal behavior for the computing device with respect to the detected event; and ignore the detected anomaly if comparing the correlated data set to the pattern indicates that the detected anomaly is normal behavior for the computing device with respect to the detected event.

* * * * *